United States Patent Office 3,002,946
Patented Oct. 3, 1961

3,002,946
COATING COMPOSITION OF POLYSILOXANE RESIN AND TWO POLYSILOXANE FLUIDS
Robert N. Thomas, Midland, Mich., assignor to Dow Corning Corporation, Midland, Mich., a corporation of Michigan
No Drawing. Filed Nov. 25, 1957, Ser. No. 698,336
2 Claims. (Cl. 260—29.1)

This invention relates to improved organopolysiloxane resin coatings, especially for cooking utensils.

The use of siloxane resins and siloxane fluids for coating cooking utensils such as bread pans, skillets and the like has been practiced commercially for some time. This use is particularly set forth in U.S. Patents 2,606,510 (resin) and 2,462,242 (fluid). A thermosetting hydroxylated methylphenyl organopolysilane-polysiloxane resin was employed for this use in U.S. Patent 2,672,104. Siloxane-coated cooking utensils, especially those that are coated with thermosetting siloxane resins, are particularly useful because food cooked therein will release from the surface without the necessity of using grease. This is particularly true of bread, and as a result siloxane resin coated bread pans are now extensively used in bakeries.

Unfortunately, it was found that certain types of foods do not release satisfactorily from the siloxane resins and fluids described in the aforementioned patents. For example, cakes, pies, pastries, cookies and other types of foods which are high in sugar content and/or moisture content tend to stick to the conventional siloxane coatings heretofore employed. Consequently, the heretofore employed siloxanes could not be used successfully for a wide variety of foods which are prepared in commercial bakeries or by housewives.

This problem was alleviated by the vinyl-containing siloxane resins disclosed by Robert C. Hedlund in his copending application Serial No. 635,988, filed January 24, 1957, now U.S. Patent 2,833,441. These particular resins give clean release to sugary doughs where the standard siloxane resins previously employed do not.

However, it has been found that the materials of Hedlund are not as satisfactory as the standard resins where there is no problem of high sugar or moisture content in the dough to be baked. Until the present time then it has been necessary for commercial bakeries to stock two different resin formulations and to distinguish between pans coated with such formulations. The problem was to find a coating for a cooking utensil which would be effective for all types of cooking. Applicant has found a solution to this problem.

This invention relates to a cured coating composition consisting essentially of (1) from 80 to 98 percent by weight of a phenylmethylpolysiloxane resin with a total of from 1 to 1.7 hydrocarbon radicals per silicon atom, (2) from 1 to 10 percent by weight of a phenylmethyl siloxane fluid which has from 1.99 to 2.0 hydrocarbon radicals per silicon atom and which contains at least 1 percent by weight of silicon-bonded hydroxyl groups and (3) from 1 to 10 percent by weight of a non-hydroxylated methyl siloxane fluid which has at least 2.0 monovalent hydrocarbon radicals per silicon atom, which is incompatibile with (1) and (2), which has a viscosity at 25° C. of not more than 1,000,000 cs. and which is not excessively volatile at temperatures below 300° C. This invention also relates to a cooking utensil coated with the above composition and a method of baking dough in a utensil so coated.

Siloxane (1) can be any copolymer of monomethylsiloxane units, monophenylsiloxane units, phenylmethylsiloxane units, dimethylsiloxane units and diphenylsiloxane units. Small amounts in the copolymer of monoethylsiloxane units, ethylmethylsiloxane units, ethylphenylsiloxane units and diethylsiloxane units can be tolerated, but they are not desirable. Likewise, $SiO_2$ units and triorganosiloxane units containing any combination of methyl, phenyl and ethyl radicals can be present, but the ratio of organic radicals to silicon atoms must range from 1:1 to 1.7:1.

Siloxane fluid (2) contains essentially phenylmethylsiloxane units, dimethylsiloxane units and diphenylsiloxane units. There can be up to one mol percent monomethyl- or monophenylsiloxane units present. Here again some ethyl siloxane units can be tolerated. The fluid can be a homopolymer, a copolymer or a mixture of any combination of these. However, the average degree of substitution of this fluid, i.e. the number of methyl and phenyl groups per silicon, must be between 1.99 and 2.0, and there must be at least one percent by weight of silicon-bonded hydroxyl groups based on the total weight of siloxane fluid (2).

Siloxane fluid (3) contains essentially no silicon-bonded hydroxyl groups and includes those fluids in which all of the organic radicals are methyl radicals together with those fluids in which some of the organic radicals are other than methyl radicals, such as ethyl, phenyl, xenyl and the like. Thus, for example, fluid (3) can be dimethylpolysiloxane or a copolymer of di-methyl- and trimethylsiloxane units or a copolymer of dimethylsiloxane units with other alkyl and aryl hydrocarbon siloxane units, such as phenylmethylsiloxane, diphenylsiloxane, diethylsiloxane, xenylmethylsiloxane, ethylmethylsiloxane, phenyldimethylsiloxane and methyldiphenylsiloxane units. In general, fluids which are incompatible with (1) and (2) are those which contain at least 75 mol percent dimethylsiloxane units. Fluid (3) can also be a mixture of any of the above polymers.

The compositions of this invention are prepared by merely mixing the ingredients. This mixing is most conveniently done in a mutual solvent, such as toluene, xylene, perchloroethylene, methylene chloride, petroleum ethers and the like. The solution is then applied to the article to be coated, e.g. a cooking utensil, in any desired manner such as by dipping, brushing, spraying or flooding. After coating the resin is then cured by heating to a suitable temperature, generally, from 180° to 300° C. or higher.

It is necessary during this cure that the non-curing fluid (3) be sufficiently non-volatile to stay in or on the coating. Consequently, the vapor pressure of fluid (3) at 300° C. should be less than 20 mm. Hg. It is also necessary that fluid (3) be a fluid at temperatures up to 300° C., i.e. have a viscosity of less than 1,000,000 cs. at 25° C. As the proportion of fluid (3) increases, there is a tendency for the resin (1) not to wet the pan. This can be offset by employing a very volatile solvent. However, too much of such a solvent will break up the curing resin (1).

In order to hasten the cure of the resin, conventional siloxane resin catalysts may be employed. Such catalysts include carboxylic acid salts of metals such as lead naphthenate, tin octoate, dibutyltin diacetate, ferric naphthenate, cobalt octoate and zinc 2-ethylhexoate and quaternary ammonium compounds such as tetramethylammonium acetate and benzyltrimethylammonium hydroxide.

After the resin is cured on the utensil, the latter may then be employed in the baking of foods. When sugared dough is used, this coating composition has release properties which are equivalent to or slightly better than those of the aforementioned compositions of Hedlund and which are much better than those of the compositions of U.S. Patent 2,606,510. On the other hand when regular bread dough is used, the coating of this invention is better than the aforementioned coating of Hedlund and equal to or better than the coatings of U.S. Patent 2,606,510 with respect to release. When a wet dough is used, the coatings of this invention are superior to any of the aforementioned coatings of the art.

While the essential ingredients of the coating composition of this invention are siloxanes (1), (2) and (3), the coating may contain other non-essential ingredients, such as pigments, curing catalysts, fillers, oxidation inhibitors and other materials which may be added to improved specific properties of the coating, without departing from the scope of this invention.

The following examples are merely illustrative and should not be construed as limiting the invention which is properly set forth in the appended claims.

*Example 1*

Several formulations were prepared for coating bread pans. The base resin composition A consisted of (1) 40 parts by weight of a siloxane copolymer consisting of 30 mol percent monomethylsiloxane units, 30 mol percent dimethylsiloxane units, 30 mol percent monophenylsiloxane units and 10 mol percent diphenylsiloxane units, employed as a 50 percent by weight solution in xylene, (2) 10 parts by weight of propylene glycol monomethyl ether, (3) 50 parts by weight of an approximately 50—50 weight mixture of xylene and mineral spirits and (4) 2 parts by weight of ferric octoate.

Formulation I consisted of composition A with 0.4 percent by weight based on the weight of A of a non-hydroxylated fluid B consisting of 10 mol percent phenylmethylsiloxane units and the remainder being di- and trimethylsiloxane units in such ratios as to give a fluid having a viscosity at 25° C. of 20,000 to 30,000 cs. Formulation II consisted of composition A with 4 percent by weight based on the weight of A of fluid B. Formulation III consisted of composition A with 2.5 percent by weight based on the weight of A of fluid B and 7.5 percent by weight based on the weight of A of a trimethylsiloxy-endblocked vinylmethylpolysiloxane fluid. Formulation IV consisted of composition A with 2.5 percent by weight based on the weight of A of fluid B and 2 percent by weight based on the weight of A of a phenylmethylpolysiloxane fluid containing at least 3 percent by weight silicon-bonded hydroxyl radicals.

Bread pans were coated with these resin formulations which were all cured in two hours at 425° F. (218° C.). A wet, sticky bread dough was baked in the treated pans. The data listed shows average number of bakes per formulation before release became unsatisfactory.

| Formulation: | No. of bakes |
|---|---|
| I | 15–60 |
| II | 40 |
| III | 40 |
| IV | 154 |

*Example 2*

A similar test was run with a comparatively dry non-sticky dough. The pans compared were coated with formulations III and IV.

| Formulation: | No. of bakes |
|---|---|
| III | 130 |
| IV | 225+ |

That which is claimed is:

1. A cured coating composition consisting essentially of (1) from 80 to 98 percent by weight of a phenyl methyl siloxane resin with a total per silicon atom of from 1 to 1.7 hydrocarbon radicals selected from the group consisting of phenyl, methyl and ethyl radicals, (2) from 1 to 10 percent by weight of a phenyl methyl siloxane fluid which has per silicon atom from 1.99 to 2.0 hydrocarbon radicals selected from the group consisting of phenyl, methyl and ethyl radicals and which contains at least one percent by weight of silicon-bonded hydroxyl groups and (3) from 1 to 10 percent by weight of a siloxane fluid in which the silicon valences not satisfied by the siloxane linkage are satisfied by monovalent hydrocarbon radicals, there being at least two monovalent hydrocarbon radicals per silicon atom and in which fluid at least 75 mol percent of the diorganosiloxane units are dimethylsiloxane units, said fluid (3) being incompatible with (1) and (2); having a viscosity at 25° C. of not more than 1,000,000 cs. and having a vapor pressure of less than 20 mm. Hg at 300° C.

2. A cooking utensil coated with the composition of claim 1.

References Cited in the file of this patent

UNITED STATES PATENTS

| 2,037,029 | Knowles | Apr. 14, 1936 |
| 2,462,242 | Webb et al. | Feb. 22, 1949 |
| 2,558,294 | Finizie | June 26, 1951 |
| 2,672,104 | Clark | Mar. 16, 1954 |
| 2,728,736 | Hunter et al. | Dec. 27, 1955 |
| 2,793,197 | Brown | May 21, 1957 |
| 2,814,601 | Currie et al. | Nov. 26, 1957 |
| 2,819,236 | Dickmann | Jan. 7, 1958 |
| 2,833,441 | Hedlund | May 6, 1958 |